UNITED STATES PATENT OFFICE.

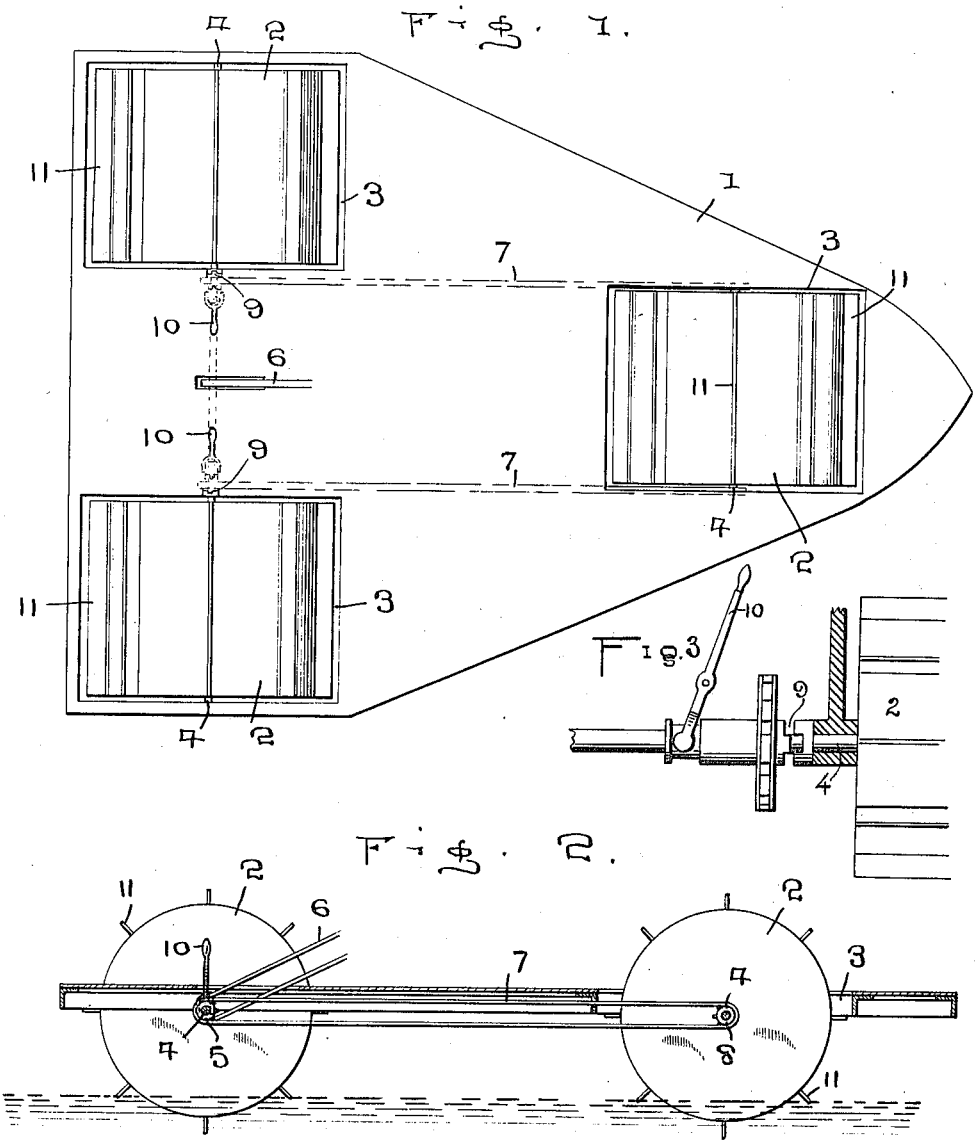

JOHN E. BELL, OF GEDDES, SOUTH DAKOTA.

WATER-MOTOR.

961,749.   Specification of Letters Patent.   Patented June 21, 1910.

Application filed April 6, 1909.   Serial No. 488,156.

*To all whom it may concern:*

Be it known that I, JOHN E. BELL, a citizen of the United States, residing at Geddes, in the county of Charles Mix and State of South Dakota, have invented certain new and useful Improvements in Water-Motors; and I do hereby declare the following to be a full, clear, and exact description of the invention, such as will enable others skilled in the art to which it appertains to make and use the same.

My invention relates to new and useful improvements in water motors and my object is to provide means for supporting the body of the vehicle above the water.

A further object is to provide means for propelling the vehicle.

A further object is to provide means for guiding the vehicle and a still further object is to provide means for applying power to the propelling device.

Other objects and advantages will be hereinafter referred to and more particularly pointed out in the claim.

In the accompanying drawings forming part of this application, Figure 1 is a top plan view of the motor complete, and, Fig. 2 is a longitudinal sectional view thereof. Fig. 3 is an enlarged elevation of the clutch mechanism, showing the operation of the same in connection with a drum.

Referring to the drawings in which similar reference numerals designate corresponding parts throughout the several views, 1 indicates the frame of the motor, which may be constructed in any preferred manner and 2 indicates drums which are adapted to extend through openings 3 in the frame, said drums being mounted upon axles 4, which axles are rotatably mounted below the frame.

The shafts or axles are to be driven from any suitable form of motor (not shown) and when the drums are arranged in the manner shown in Fig. 1, the forward axle is provided with a sprocket 5, which sprocket is connected with the propelling medium by a sprocket chain 6, while the central drum is driven from the forward axle by extending sprocket chains 7 from sprockets on the forward axle to sprockets 8 on the axle supporting the single drum, thereby imparting rotating movement to all of the drums simultaneously and in unison.

The axle supporting the two drums is made in sections and said sections are connected by means of clutches 9, propelling levers 10 extending upwardly from the clutches and through openings in the frame 1, by which means either of the two drums mounted upon the one shaft may be disconnected from the axle upon which they are mounted.

In this manner of constructing the device, it will be readily seen that without employing the usual form of rudder, the vehicle can be readily guided, as the stopping of one of the drums and rotating the opposite drum will change the course of the vehicle. The drums are formed to maintain buoyancy and by making the drums of sufficient buoyancy, the frame 1 will be supported above the surface of the water, thereby eliminating friction which would be occasioned by engaging the frame with the water, whereby the vehicle can be more readily propelled and by placing paddles 11 at intervals around the peripheries of the drums, the vehicle will be positively driven when the drums are rotated. It will likewise be seen that by forming the drums cylindrical as shown and rotating the same, they will readily move through the water, the rolling action thereof practically eliminating friction between the drums and water.

What I claim is:

A device of the character described, comprising a supporting frame, a forward and a rear shaft journaled in said frame, said forward shaft carrying at either end a drum, said rear shaft carrying a centrally located drum, said drums being buoyant and provided with radial propelling blades, means for applying power to said forward shaft and means for transferring said power to the rear shaft, said means consisting of sprockets upon each shaft and endless belts engaging said sprockets, and means whereby either or both of the forward drums may be stopped without stopping the rear drum, said latter means consisting of clutches and levers placed one on each side of the forward shaft between the sprockets and the drums.

In testimony whereof I have signed my name to this specification in the presence of two subscribing witnesses.

JOHN E. BELL.

Witnesses:
J. E. TIPTON,
J. E. COOPER.